US006989183B2

(12) United States Patent
McKillip

(10) Patent No.: US 6,989,183 B2
(45) Date of Patent: Jan. 24, 2006

(54) INTEGRATED FORMS AND METHOD OF MAKING SUCH FORMS

(75) Inventor: John J. McKillip, Chicago, IL (US)

(73) Assignee: Malessa Partners, L.L.C., Rockford, IL (US)

( * ) Notice: Subject to any disclaimer, the term of this patent is extended or adjusted under 35 U.S.C. 154(b) by 0 days.

(21) Appl. No.: 10/395,360

(22) Filed: Mar. 24, 2003

(65) Prior Publication Data

US 2003/0186014 A1 Oct. 2, 2003

Related U.S. Application Data

(62) Division of application No. 09/417,372, filed on Oct. 13, 1999, now Pat. No. 6,656,555.

(51) Int. Cl.
*B32B 3/00* (2006.01)
*B32B 31/00* (2006.01)

(52) U.S. Cl. ...................... 428/40.1; 156/248; 156/257; 156/277; 283/81; 283/98; 283/101; 428/42.1; 428/42.2; 428/42.3; 428/43; 428/201; 428/202

(58) Field of Classification Search ................ 428/40.1, 428/42.1, 42.2, 42.3, 43, 201, 202; 283/81, 283/98, 101; 156/248, 257, 277
See application file for complete search history.

(56) References Cited

U.S. PATENT DOCUMENTS 3,291,044 A 12/1966 Van Der Winden
3,726,710 A 4/1973 Berger et al.
3,861,912 A 1/1975 Ibrahim
3,863,567 A 2/1975 Hastings
4,379,573 A 4/1983 Lomeli et al.

(Continued)

OTHER PUBLICATIONS

Chicago Tag & Label, Inc.'s Response to Malessa's First Set of Interrogatories, Mar. 31, 2003 (12 pages). pp. 1, 11–21.
Chicago Tag & Label, Inc.'s Supplemental Response to Malessa's First Set of Interrogatories, including exhibits, Jun. 24, 2003 (13 pages). pp. 1–6, 8–14.
Transcript of Patrick J. Quinlan's Deposition, Aug. 27, 2003 (11 pages). pp. 1, 14–52, 63–65.
Transcript of James Schulty's Deposition, Jun. 6, 2003 (16 pages). pp. 1, 59–107, 177–181.
Transcript of Davis Steidinger's Deposition, Jun. 19, 2003 (14 pages). pp. 1, 32–63, 103–104, 110–119, 181–185.

(Continued)

*Primary Examiner*—Nasser Ahmad
(74) *Attorney, Agent, or Firm*—Fitch, Even, Tabin & Flannery

(57) ABSTRACT

A form that incorporates either a label or card such that the form can be reliably printed on by the end user and manufactured less expensively. The integrated label form includes a top printable substrate and a liner substrate mated together by an adhesive. The top printable substrate serves at least partially as removable portions capable of being reapplied. Weakened lines of substrate may be provided to define removable portions on the top printable substrate. The form also may include a similar printable substrate mated to the other side of the liner by adhesive. Weakened lines of substrate also may formed in the second substrate to define removable portions. The integrated card form includes a printable substrate and a first and second laminate mated to the substrate and together by an adhesive. Weakened lines of substrate and first laminate define an integrated removable portion capable of being held in the form by the second laminate and easily removed manually when desired. In the integrated card form and the integrated label form, a recess may be provided adjacent the removable portion to facilitate removal of the removable portion. The integrated forms are easily manufactured by a single piece of equipment.

18 Claims, 4 Drawing Sheets

U.S. PATENT DOCUMENTS

| | | | | |
|---|---|---|---|---|
| 4,461,661 | A | 7/1984 | Fabel | |
| 4,495,582 | A | 1/1985 | Dessert et al. | |
| 4,512,256 | A | 4/1985 | Schriber et al. | |
| 4,664,031 | A | 5/1987 | McKillip | |
| 4,715,530 | A | 12/1987 | Leese et al. | |
| 4,824,503 | A | 4/1989 | Wilen | |
| 4,960,482 | A | 10/1990 | Crane et al. | |
| 4,977,006 | A | 12/1990 | Smith et al. | |
| 5,011,559 | A | 4/1991 | Felix | |
| 5,021,110 | A | 6/1991 | Kobayashi | |
| 5,078,375 | A | 1/1992 | Steidinger | |
| 5,086,683 | A | 2/1992 | Steidinger | |
| 5,098,759 | A | 3/1992 | Felix | |
| 5,129,682 | A | 7/1992 | Ashby | |
| 5,143,466 | A | 9/1992 | Baldwin | |
| 5,211,096 | A | 5/1993 | Steidinger | |
| 5,224,408 | A | 7/1993 | Steidinger | |
| 5,238,182 | A | 8/1993 | Loch | |
| 5,262,214 | A | 11/1993 | Instance | |
| 5,324,153 | A | 6/1994 | Chess | |
| 5,337,663 | A | 8/1994 | McKillip | |
| 5,351,426 | A | 10/1994 | Voy et al. | |
| 5,381,947 | A | 1/1995 | Steidinger | |
| 5,405,076 | A | 4/1995 | Steidinger | |
| 5,427,832 | A | 6/1995 | Longtin | |
| 5,441,796 | A | 8/1995 | Steidinger et al. | |
| 5,462,488 | A | 10/1995 | McKillip | |
| 5,466,013 | A | 11/1995 | Garrison | |
| 5,507,901 | A | 4/1996 | Limina et al. | |
| 5,540,148 | A | 7/1996 | Oumiya et al. | |
| 5,562,789 | A | 10/1996 | Hoffmann | |
| 5,580,640 | A | 12/1996 | Kraft et al. | |
| 5,589,025 | A | * 12/1996 | Garrison | 156/268 |
| 5,632,842 | A | 5/1997 | Oliver et al. | |
| 5,640,831 | A | 6/1997 | Harrod et al. | |
| 5,640,835 | A | 6/1997 | Muscoplat | |
| 5,656,369 | A | 8/1997 | Chess et al. | |
| 5,657,529 | A | 8/1997 | Bohn et al. | |
| 5,674,334 | A | 10/1997 | Instance | |
| 5,700,536 | A | 12/1997 | Steidinger | |
| 5,707,475 | A | 1/1998 | Steidinger et al. | |
| 5,736,212 | A | * 4/1998 | Fischer | 428/42.2 |
| 5,766,401 | A | 6/1998 | Campbell | |
| 5,776,289 | A | 7/1998 | Steidinger | |
| 5,782,691 | A | 7/1998 | Stewart | |
| 5,807,623 | A | 9/1998 | Chess | |
| 5,861,457 | A | 1/1999 | Weidner et al. | |
| 5,890,743 | A | 4/1999 | Garrison et al. | |
| 5,928,748 | A | 7/1999 | Jones et al. | |
| 5,941,451 | A | 8/1999 | Dexter | |
| 5,951,054 | A | 9/1999 | Hagen | |
| 5,981,013 | A | 11/1999 | Russ et al. | |
| 6,013,693 | A | 1/2000 | Takahashi et al. | |
| 6,027,780 | A | 2/2000 | Treleaven et al. | |
| 6,030,482 | A | 2/2000 | Osaka | |
| 6,051,311 | A | 4/2000 | Osaka | |
| 6,071,585 | A | 6/2000 | Roth | |
| 6,077,611 | A | 6/2000 | Griswold et al. | |
| 6,086,694 | A | 7/2000 | Winter et al. | |
| 6,177,163 | B1 | 1/2001 | Blok et al. | |
| 6,190,747 | B1 | 2/2001 | Fischer | |
| 6,217,078 | B1 | 4/2001 | Roth et al. | |
| 6,322,655 | B1 | * 11/2001 | Casagrande | 156/257 |
| 6,328,340 | B1 | * 12/2001 | Fischer | 283/62 |
| 6,352,287 | B2 | * 3/2002 | Casagrande | 283/81 |
| 6,403,191 | B1 | * 6/2002 | Casagrande | 428/42.2 |

OTHER PUBLICATIONS

Transcript of Steve Kreuzer's Deposition, Sep. 8, 2003 (21 pages). pp. 1, 9–84, 90.

Transcript of David W. Paularena's Deposition, Aug. 29, 2003 (5 pages). pp. 1, 52–54, 75–76, 92.

Fax from P.J. Quinlan to Dave Paularena dated May 24, 1997 (1 page).

Letter to P.J. Quilan from Natasha Stone on Webtron stationery dated Feb. 2, 1998 (1 page) enclosing Machine Order and Contract dated Feb. 2, 1998 (2 pages).

Drawing No. DP–1853 entitled "Flexo Press BX 1305" with handwritten markings and dated Jun. 17, 1998 (1 sheet).

Letter on Aquaflex stationery to Mr. Quinlan from Daniel Presseault hand dated Apr. 10, 1998 with hand drawing titled "Proposal for 'Preferred Customer Club'" (2 pages).

Drawing No. DP–1945–1 entitled "Flexo Press BX 1308(4)" dated Jul. 29, 1998 with photographs attached (3 sheets).

Letter on Tamarack stationery from Gayle Harrop to a Jim Schulty dated Feb. 14, 1998 enclosing document entitled "Tamarack Affixing Equipment" dated Mar. 9, 1998 (2 pages).

Letter to Mark Hetzler from David Steidinger dated Nov. 23, 1999 (9 pages).

Letter to Jim Schulty from David Steidinger dated May 13, 1999 (2 pages).

Letter to Jim Schulty from David Steidinger dated May 11, 1999 (3 pages).

Letter to Jim Schulty from Gayle Harrop dated May 7, 1999 (1 page).

Drawing No. 920629, entitled "Proposal for UARCO Business Forms" and dated Jun. 29, 1992 (1 sheet).

Drawing No. 921014, entitled "Hamilton Jumbo/Stencil–Label Applicator" and dated Oct. 14, 1992 (1 sheet).

Document entitled "Label/Form Combinations New Ideas for the Growing Market" and dated 1993 (15 pages).

Document entitled "Label/Form Combinations New Ideas for the Growing Market" (no date shown) (8 pages).

Drawing No. 930710, entitled "F300R Top Loading–Turn Pin Band Rotary Collator" and dated Jan. 24, 1992 (1 sheet).

Document entitled "formsmfg" and dated Aug. 1993 (2 pages).

Document entitled "Form Your Future With Flexible Manufacturing" (no date shown) (2 pages).

Drawing No. 930928, entitled "Tamarack Label Application In–Line Installation With Hamilton 28 "D. Roll 20 " Web Collator for General Business Forms" and dated Sep. 27, 1993 (1 sheet).

Document entitled "General Business Forms" and dated Oct. 29, 1993 (3 pages).

Document entitled "Tamarack Products Inc. Invoice No. 940921" and dated Sep. 21, 1994 (3 pages).

Drawing No. 931012, entitled "Proposal for Uarco–in Line Installation Of Tamarack Window Patch Applicator for Didde Web Press" (no date shown) (1 sheet).

Document entitled "Purchase Order No. BA–067631" and dated Dec. 13, 1993 (10 pages).

Document entitled "Tamarack Products Inc. Invoice No. 940817" and dated Aug. 17, 1994 (1 page).

Document entitled "Tamarack Products Inc. Invoice No. 941221" and dated Dec. 21, 1994 (1 page).

Document entitled "A New Day Is Dawning In The Business Forms Industry" (no date shown) (4 pages).

Document entitled "Digipress 300XE/C" (no date shown) ( 2 pages).

Document entitled "Tamarack Label Applicator" and dated Dec. 1993 (12 pages).

Document entitled "Showplace Exhibitors Product Index" and dated Apr. 10–13, 1994 (2 pages).
Document entitled "Formations 94 Showplace Exhibition Map" (no date shown) ( 4 pages).
Document entitled "Tamarack Affixing Equipment Integrated with an Aquaflex press for GenForms" dated Aug. 1, 1997, and letters dated Jul. 2, 1997, Jul. 10, 1997, Aug. 1, 1997 and Sep. 3, 1997 (6 pages).
Drawing No. 970709–1, entitled "Proposal for Aquaflex Press" and dated Nov. 22, 1999 (1 sheet).
Document entitled "GenForms Purchase Order" and dated Feb. 4, 1998 (1 page).
Letter on Aquaflex stationary to Mr. Quinlan and dated Mar. 25, 1998 (2 pages).
Drawing No. DP–1935 entitled "Flexo Press BX 1305" and dated Mar. 24, 1998 (1 sheet).
Document on Tamarack stationary entitled "Invoice" having No. 940817, addressed to Uarco Incorporated, and dated Aug. 17, 1994 (2 pages).
Document on Tamarack stationary entitled "Invoice" having No. 940815, addressed to Uarco Incorporated, and dated Aug. 15, 1994 (2 pages).
Undated Document on Tamarack stationary entitled "Tamarack Label Applicator Accessories" (1 page).
Document on Tamarack stationary entitled "Invoice" having No. 941221, addressed to Uarco Incorporated, and dated Dec. 21, 1994 (1 page).
Document on Tamarack stationary entitled "Invoice" having No. 940625, addressed to Uarco Incorporated, and dated Jun. 24, 1994 (3 pages).
Document on Tamarack stationary entitled "Purchase Order" having No. 940202, addressed to Tamarack Products, and dated Feb. 1, 1994 (2 pages).
Document on Tamarack stationary entitled "Purchase Order" having No. 940201, addressed to Tamarack Products, and dated Feb. 1, 1994 (1 page).
Document having a Uarco Incorporated header and entitled "Purchase Order No. BA–067631, consisting of 10 pages," addressed to Tamarack Products, Inc., dated Dec. 13, 1993, and unsigned by Tamarack Products, Inc. (10 pages).
Black and white photographs having handwritten notes and of unknown date and author (3 pages).
Document entitled "Interoffice Memo" from a Steve Kreuzer to a George Zehner and dated Dec. 27, 1994 (1 page).
Document entitled "Interoffice Memo" from a Steve Kreuzer to a Don Sanders and dated Feb. 3, 1995 (1 page).
Document entitled "Interoffice Memo" from a Steve Kreuzer to a George Zehner and dated Mar. 7, 1995 (3 pages).
Untitled document from a Steve Kreuzer to a Jim Krones and dated Mar. 7, 1995 (3 pages).
Document entitled "Interoffice Memo" from a Steve Kreuzer to a George Zehner and dated Mar. 20, 1995 (2 pages).
Document entitled "Interoffice Memo" from Steve Kreuzer to "Distribution" and dated Jul. 21, 1995 (1 page).
Document entitled "Interoffice Memo" from a Steve Kreuzer to a George Zehner dated Jan. 19, 1998 (1 page).
Document entitled "Interoffice Memo" from a Steve Kreuzer to a Jim Reutter dated Jan. 19, 1996 (1 page).
Document entitled "Interoffice Memo" from a Steve Kreuzer to a Tony Gallagher dated Aug. 2, 1996 (2 pages).
Document entitled "Interoffice Memo" from a Steve Kreuzer to a Ken Bobbe dated Aug. 28, 1996 (1 page).
Black and white photographs having handwritten notes and of unknown date and author (3 pages).
Letter on Tamarack stationary from a Janet Wigodner addressed to a Ray Turnbull dated Jul. 8, 1993 (1 page).
Letter on Tamarack stationary from a David Steidinger addressed to a Jim Reed dated Mar. 6, 1996 (2 pages).
Document on Tamarack stationary entitled "Tamarack Label Applicator Mark Andy, Inc., Proposal 1" dated Mar. 5, 1996 (2 pages).
Document on Tamarack stationary entitled "Tamarack Label Applicator Mark Andy, Inc., Proposal 2" dated Mar. 5, 1996 (2 pages).
Drawing entitled "Tamarack Label Applicator Section . . . " with unknown notes and of an unknown date and author (1 page).
Letter on GenForms & Labels stationary from a P.J. Quinlan to a David Steidinger dated Dec. 3, 2001 having handwritten notes of an unknown date (1 page).
Black and white photographs having handwritten notes and of unknown date and author (1 page).
Unsigned letter on Tamarack stationary from a Janet Wigodner to a Tony Dolci dated Dec. 9, 1993 (1 page).
Letter on Tamarack stationary from a Jane Wigodner to a Dave Barbee dated Jun. 6, 1994 (1 page).
Document entitled "Tamarack Affixing Section 1994 Quotation for Rand McNally" (2 pages).
Unsigned Interoffice Memo from a Janet Wigodner to a Mark Steidinger dated Jul. 13, 1994 with handwritten notes of an unknown date (2 pages).
Letter on Tamarack stationary from a Janet Wigodner addressed to a Dave Barbee dated Jul. 31, 1994 (1 page).
Document entitled "Tamarack Affixing Section–1994 Quotation for Rand McNally Revised Jul. 21, 1994" (2 pages).
Fax document addressed to a Daniel Presseault dated Jun. 9, 1997 having handwritten notes and drawings (1 page).
Document entitled "Infosheet: One Page Profile" having a handwritten date of Jun. 9, 1997 (1 page).
Letter on Aquaflex stationary from a Daniel Presseault addressed to a P.J. Quinlan dated Jun. 24, 1997 (2 pages).
Letter on Tamarack stationary from a Tom Slager to a Daniel Prusseaulte dated Jul. 2, 1997 (1 page) with two drawings dated Jul. 1, 1997 and having handwritten notations (2 pages).
Unsigned Letter to a Dave Paularena from an unknown author dated May 24, 1997 (1 page).
Letter on GenForms & Labels stationary from a P.J. Quinlan to a Dominique Quellet dated Apr. 8, 1998 (2 pages) enclosing two samples (2 pages).
Letter on Aquaflex stationary from a Daniel Presseault to a P.J. Quinlan dated Apr. 10, 1998 (1 page) enclosing a hand drawing dated Apr. 10, 1998 (1 page).
Letter on Aquaflex stationary from a Dominique Quellet to a P.J. Quinlan dated May 19, 1998 (1 page).
Letter on Aquaflex stationary from a Dominique Quellet to a P.J. Quinlan dated May 20, 1998 (1 page).
Unsigned letter on Tamarack stationary from a Ron McManus to a Dominique Quellet dated May 20, 1998 (1 page).
Aquaflex Drawing No. DP–1935, entitled "Flexo Press BX 1305(*)" and dated Mar. 24, 1998(1 page).
Unsigned letter from a Janet Wigodner to a Mr. Bruce Driver dated Jan. 24, 1994 (2 pages).
Letter on Tamarack stationary from a David J. Steidinger to a Mr. Tom Yeager dated Sep. 25, 1997 (2 pages).
Ivara Sarkans, "In–Line Finishing Customizes Forms," *Business Forms, Labels & Systems,* Sep. 1991 (2 pages).

*Form,* Sep. 1996 (2 pages).
*Business Forms, Labels & Systems,* Jan. 20, 1997 (3 pages).
Tamarack Brochure having a footer reading "Print '97 McCormick Place, Chicago" (2 pages).
*Innovation,* Issue 2 dated Summer 1997 (4 pages).
Document entitled "Bielomatik—Web–Finishing Machine" (pp. A656–A667).
Letter on Bielomatik stationary from a Marty Papertec to a Mr. Greatname (1 page) with flyer (6 pages).
Document entitled "Introducing the Tamarack VERSA–WEB P500 Labelexpo '98—Booth #2729" (1 page).
Letter on Tamarack stationary from a Gayle Harrop to a Jim Schulty dated Feb. 6, 1998 (2 pages) enclosing document entitled "Tamarack Finishing Equipment" dated Feb. 6, 1998 (4 pages).
Letter on Tamarack stationary from a Gayle Harrop to a Jim Schulty dated Mar. 10, 1998 (1 page) enclosing document entitled "Tamarack Affixing Equipment" dated Mar. 9, 1998 (2 pages).
Unsigned letter on Tamarack stationary from a Janet Wigodner to a Jeanne Iglesias dated Jul. 27, 1993 having a handwritten notation dated Jul. 27, 1993 (1 page) enclosing document entitled "Label/Form Combinations–New Ideas for the Growing Market" (8 pages).
Letter on Tamarack stationary from a Janet Wigodner to a Mr. Bob Evans date Apr. 25, 1994 (2 pages).
Unsigned letter from a David Steidinger to a J. Buster Weinzierl dated Apr. 19, 1994 (2 pages) enclosing document entitled "Tamarack Label Applicator–1994 Quotation for Belknap Business Forms" (2 pages).
Unsigned letter on Tamarack stationary from a David Steidinger to a George Bakemayer dated May 6, 1994 (2 pages). Enclosing drawing entitled "Concept 'A'" of unknown date (1 page) and drawing entitled "Concept 'B'" of unknown date (1 page).
Letter on Tamarack stationary from a Mark Steidinger to a Wayne Sample dated Jun. 24, 1994 (1 page) enclosing document entitled "Tamarack Label Applicator–Proposal for IDC Corp.–1994 Quotation" (3 pages).
Steidinger, David, "Integrated Equipment," *Speaker Handouts—FormsTech Horizon '97* (6 pages).
Drawing No. 971017–1, dated Oct. 18, 1997 (1 page).
Letter on Tamarack stationary from a David J. Steidinger to a James E. Reed dated Feb. 20, 1997 (2 pages) enclosing document entitled "Tamarack Affixing Equipment for Mark Andy–Feb. 20, 1997" (3 pages).
Document on Tamarack stationary entitled "Tamarack Affixing Equipment–installed on a Mark Andy Press for National Ticket–Oct. 1, 1997" (2 pages).
Letter on Tamarack stationary to a Mr. Lippman dated Dec. 3, 1996 (1 page).
Unsigned letter on Tamarack stationary to a Mr. Schulty dated Jun. 25, 1997 (1 sheet).
Unsigned and unaddressed form letter on Tamarack stationary dated Aug. 4, 1997 (1 page).
Unsigned and unaddressed form letter on Tamarack stationary dated Aug. 22, 1997 (1 page).
Document entitled "Tamarack Products, Inc. Booth 4236, McCormick Place South Demonstration Schedule for Print '97"and dated Dec. 1997.
Photograph of Tamarack booth at Print '97 in Sep. 1997 (1 photo).
Document entitled "Tamarack Web Finishing Equipment for Integral Cards" (1997) (1 page).
Document entitled "Produce Integral Cards with the Tamarack Label Applicator" (no date shown) (1 page).
Document entitled "Introducing the Tamarack Versa–Web™ P500 Labelexpo '98—Booth #2729 (Scitex Digital Printing Booth)" (1998) (1 page).
Photograph of a Didde Press (no date known) (1 photo).
Document entitled "Innovation" and dated "Summer 1997" (4 pages).
Letter on Tamarack stationary to a Mr. Gallagher dated Jan. 25, 1993 (3 pages).
Letter on Tamarack stationary to a Mr. Gallagher dated Apr. 21, 1993 (2 pages).
Document on Tamarack stationary entitled "1993 Prices" (1 page).
Unsigned letter to a Mr. Maynard dated Jul. 10, 1998 (3 pages) with document entitled "Option 1: Tamarack Label Applicator for Uarco Jul. 5, 1996" (5 pages), document entitled "Option 2: Tamarack label Applicator for Uarco Jul. 5, 1996" (6 pages) and document entitled "Option 3: Tamarack Label Applicator for Uarco Jul. 5, 1996" (4 pages).
Unsigned letter on Tamarack stationary to a Mr. Casper dated Aug. 13, 1993 (3 pages).
Document on Tamarack stationary entitled "Tamarack Affixing Equipment Installed In–Line on Press 1993 Quotation" (3 pages).
Document on Tamarack stationary entitled "Tamarack Affixing Equipment Installed In–Line on Press 1993 Quotation" (1 page).
Letter on Tamarack stationary to a Mr. Clark dated Jun. 8, 1994 (2 pages).
Unsigned letter on Tamarack stationary to a Mr. Foye dated Jul. 29, 1984 (1 page).
Unsigned letter on Tamarack stationary to a Mr. Foye dated Feb. 16, 1995 (2 pages) with document entitled "Tamarack Label Applicator Moore Business Forms Feb. 10, 1995" (5 pages).
Letter on Webtron stationary to a Ms. Whitely dated Feb. 10, 1995 (1 page).
Letter on Tamarack stationary to a Mr. Neal dated Feb. 24, 1995 (2 pages) with document on Tamarack stationary entitled "Tamarack Label Applicator Moore Business Forms Feb. 20, 1995" (4 pages).
Document on Tamarack stationary entitled "Tamarack Label Applicator Moore Business Forms Feb. 10, 1995" (2 pages).
Letter on Tamarack stationary to a Mr. Campbell dated Jan. 15, 1993 (2 pages).
Letter on Tamarack stationary to a Mr. Sweet dated Oct. 18, 1993 (2 pages).
Unsigned letter to a Mr. Campbell dated Jan. 24, 1994 (2 pages).
Letter on Tamarack stationary to a Mr. Reed dated Mar. 6, 1996 (2 pages) with document on Tamarack stationary entitled "Tamarack Label Applicator Mark Andy, Inc." (5 pages).
Unsigned and incomplete letter to a Mr. Paularene dated May 24, 1997 (1 page).
Letter on Aquaflex stationary to a Mr. Quinlan dated Jun. 24, 1997 (2 pages).
Document entitled "Tamarack Affixing Equipment Integrated with an Aquaflex Press for GenForms Aug. 1, 1997" (2 pages).
Drawing No. DP–1853 entitled "Flexo Press Bx 1305" and dated Jun. 17, 1997 (2 sheets).

Unsigned letter on Tamarack stationary to a Mr. Powell dated Jan. 23, 1995 (2 pages).
Memo to a Ms. Janet dated Feb. 24, 1995 (1 page).
Letter on Stevens International stationary to a Mr. Steidinger dated Jun. 25, 1996 (2 pages).
Letter on Tamarack stationary to a Mr. Lawrence dated Jun. 12, 1996 (2 pages) with document entitled "Spot The Ball" (1 pages).
Memo to a Ms. Janet W., Mr. Mark S., Mr. Don S., Mr. Tom S., and Mr. Ron M. dated Jun. 7, 1996 (1 page).
Letter on Tamarack stationary to a Mr. Powell dated Jul. 8, 1996 (2 pages) with document entitled "Tamarack Label Applicator for J&C Moores Jul. 5, 1996 Quotation" (3 pages).
Letter on Tamarack stationary to a Mr. Lawrence dated Apr. 23, 1996 (2 pages).
Unsigned letter on Tamarack stationary to a Mr. Powell dated Jul. 1, 1996 with drawing (3 pages).
Document entitled "Tamarack Finishing Equipment AmeriPrint Feb. 6, 1998" (4 pages).
Letter on Tamarack stationary to a Mr. Schulty dated Mar. 10, 1998 (1 page) with document entitled "Tamarack Affixing Equipment Integrated with an Aquaflex Press for AmeriPrint Mar. 9, 1988" (2 pages).
Photograph of Uarco Press 391 no date known (1 photo).
International Search Report for International Application No. PCT/US99/19475 dated Mar. 9, 2000 (2 pages).
International Search Report for International Application No. PCT/US00/27990 dated Oct. 10, 2000 (2 pages).

* cited by examiner

INTEGRATED FORMS AND METHOD OF MAKING SUCH FORMS

This application is a divisional application of application Ser. No. 09/417,372 filed on Oct. 13, 1999, now U.S. Pat. No. 6,656,555.

FIELD OF THE INVENTION

This invention relates generally to printable forms and methods of making such forms and, more particularly, to printable forms with integrated labels and cards.

BACKGROUND OF THE INVENTION

There is a need for improved integrated business forms and methods of manufacturing such forms. Integrated forms consolidate different business objectives or services into a single form. A goal of such forms is not only to offer end users the flexibility to provide a variety of information and information transfer options through a single form, but to also reduce the time, money and material associated with using such business forms for both the end users and the form manufacturers. In the end, truly integrated forms increase the reliability, confidence and convenience in exchanging information between businesses and consumers.

The concept of an integrated form can be employed in numerous varieties depending on the objects of the particular end use. For example, an integrated form may consist of an invoice portion and a label portion incorporated into the same form. Thus, the business can print both the invoice information as well as the address information at the same time.

The mail order industry is a prime example of where such type of label is desired to ensure accurate billing and convenience to the consumer. For instance, in the mail order industry, the mail order company includes with the product an invoice, a shipping card addressed to the consumer and affixed to the packaging and a return card so that the consumer can conveniently return the purchased product within the return period. The obvious shortcoming with this process is the expense, time and possible confusion with purchasing, stocking and printing three separates pieces (i.e., the invoice, the addressee label, and the return address label or card).

An attempt to address these shortcomings is the use of a dedicated section on the invoice for printing of the return address. Thus, the form is sent through a printer which prints both the invoicing information and the return address in one process. In one form, the dedicated section may be outlined by a perforated section for detachment by the consumer. The obvious shortcomings include that the consumer must cut or tear the return address section from the form and affix it to the package with durable tape or adhesive in a manner that does not obstruct the address information. Because consumers do not always have adequate tape or adhesive, they use whatever they have available, which experience has shown, tends not to withstand the stresses associated with commercial shipping. As a result, the return address section is susceptible to falling off, which, when it occurs, often leads to disruption of the mailing system, disputes over whether the package was returned timely and damaged goods.

An attempt to address the return address situation has been made by adding a label to the form. These types of forms are commonly made by mating one side of a liner (such as a silicone coated liner) to the form and having a pressure sensitive label on the other side of the liner. The label then carries the address information, as well as the appropriate adhesive for reliable affixation to a return package. A shortcoming with this type of form is that the thickness created by the stacking of the form, the liner and the label often causes problems during the printing step. That is, the form jams the printer and prevents further use until appropriate service is undertaken. Another shortcoming is associated with pre-dispensing of the label because the label is not truly integrated with the form. That is, the label separates from the form and sticks to the rollers and/or drum of the printer. Thus, there is potential for serious damage to the printer. An even further shortcoming is the requirement additional materials to produce a three layer form, which is only capable of providing a limited number of labels on one side of the form.

Integrated forms also are desired in industries that have the need to distribute cards, such as membership cards for identification or other programs (e.g., frequent buyer programs and insurance programs). The cards traditionally have been printed separately and, to distribute such cards, they have been forwarded to the consumer under a separate forwarding cover letter. To address this situation, some companies attach the card to a form (such as a form forwarding letter) with a releasable adhesive. The obvious shortcoming is that the form is typically pre-printed and then run through a separate machine to add adhesive and the card. As a result, the card does not always become adequately affixed to the form, making it difficult to handle and susceptible to becoming unintentionally detached from the form. In addition, during removal of the card, it tends to peal off the top layer of the form, thereby reducing (and, in most cases eliminating) the backside of the card as a place for printed information.

Moreover, because the card tends to be inadequately secured to the form, it is not practical to consider printing after the card has been affixed. That is, the cards tend to fall off during the printing stage and bind up the printer. As explained above for labels, there is potential for serious damage to the printer. Thus, there is need for truly integrated forms that incorporate labels, cards, etc. into the form.

There also is the need to improve the methods of manufacturing such forms. The typical manufacturing equipment includes a paper infeed unit, a vacuum applicator unit, an unwind unit containing transfer tape, a hot melt applicator head, a feed control unit, an integral die cut unit, a hot melt unit and a fold-to-fold delivery unit. This processing equipment is commonly contained in two separate pieces of equipment. In other words, the manufacturing process is not one straight through in-line process, and therefore, tends to be expensive and labor intensive. The use of multiple machines slows the entire manufacturing process, increases costs and requires additional personnel.

Accordingly, it has been determined that there exist the need for an improved integrated form that is more end user friendly and that facilitates a more economical method of manufacturing.

SUMMARY OF THE INVENTION

In accordance with the invention, an improved integrated form is provided that enhances the use by end users and the manufacturing of such forms. In one form, there is provided an integrated from that includes a first printable substrate on one side of the form and a liner adjacent the first printable substrate. The liner has a first and second side. Adhesive on the first side of the liner maintains the first printable substrate to the first side of the liner in a manner that facilitates printing on the form without detachment of the first printable substrate. The first side of the liner is treated to permit a predetermined force to selectively remove the first printable substrate from the linear such that adhesive removes with the first printable substrate.

The first printable substrate may include a weakened line of substrate that defines at least in part a predetermined sized portion of substrate removable from the form. The weakened line of substrate resists unintentional detachment of the first printable substrate from the liner. The first printable substrate also may include a portion that extends beyond the liner.

The form may further include a second printable substrate on the other side of the form. The liner is intermediate the first and second printable substrates. Adhesive on the second side of liner maintains the second printable substrate to the second side of the liner in a manner that facilitates printing on the form without detachment of the second printable substrate. The second side of the liner being treated to permit a predetermined force to selectively remove the second printable substrate from the linear such that adhesive removes with the second printable substrate.

The second printable substrate also may include a weakened line of substrate that defines at least in part a predetermined sized portion of substrate removable from the form. The weakened line of substrate resists unintentional detachment of the second printable substrate from the liner.

The first printable substrate may also include a portion adjacent the removable portion of substrate that has been removed from the form to facilitate manual removal of the removable portion of substrate.

In another form, there is provided an integrated form that includes a printable substrate having a first side, a second side and a removable portion. A first layer of laminate covers at least a portion of one of the first and second sides of the printable substrate such that at least the removable portion of the printable substrate is covered. The first layer of laminate has a portion that is removable with the removable portion of the printable substrate. A second layer of laminate covers at least a portion of the first layer of laminate such that the second layer holds the removable portion of the substrate and first layer of laminate in the form while also allowing a predetermined force to remove the removable portion of the first layer of laminate and printable substrate from the form.

The integrated form may include a line of weakness extending through both the printable substrate and the first layer of laminate to define at least in part the removable portion of the printable substrate. The removable portion of the printable substrate also may have perimeter portion and the second layer of laminate may affix to the first layer of laminate only at the perimeter portion of the printable substrate. The form also may include a second portion of the printable substrate that is removable to facilitate removal of the other removable portion.

There also is provided a method of making an integrated form. The method includes the steps of providing a first printable substrate and providing a liner having a first and second side. Adhesive is applied to the first sides of the liner, and the first printable substrate is mated to the first side of the liner. Weakened lines of substrate in the first printable substrate are formed to define a label of predetermined size.

The method may include the steps of providing a second printable substrate, applying adhesive to the second side of the liner and mating the second printable substrate to the second side of the liner. Weakened lines of substrate may be formed in the second printable substrate to define a label of predetermined size.

The method also may include the steps of blocking the application of adhesive to a portion of the liner to be mated with the first printable substrate and removing a portion of the first printable substrate to facilitate easy removal of the label.

In another manner, there is provided a method of making an integrated form that includes the steps of providing a printable substrate having a first side and second side, applying a first layer of laminate to the second side of the printable substrate and applying a second layer of laminate to the first layer of laminate. Cut lines are formed through the printable substrate and the first layer of laminate to define a removable portion of the form being maintained in the form by the second layer of laminate until intentional removal from the form.

The method may include the step of removing a portion of the second layer of laminate across the removable portion of the printable substrate to reduce the amount a force necessary to remove the removable portion from the form. The method also may include cutting of a removable section of the form adjacent to the removable portion to facilitate removal of the removable portion.

DETAILED DESCRIPTION OF THE PREFERRED EMBODIMENT

Figure 1:
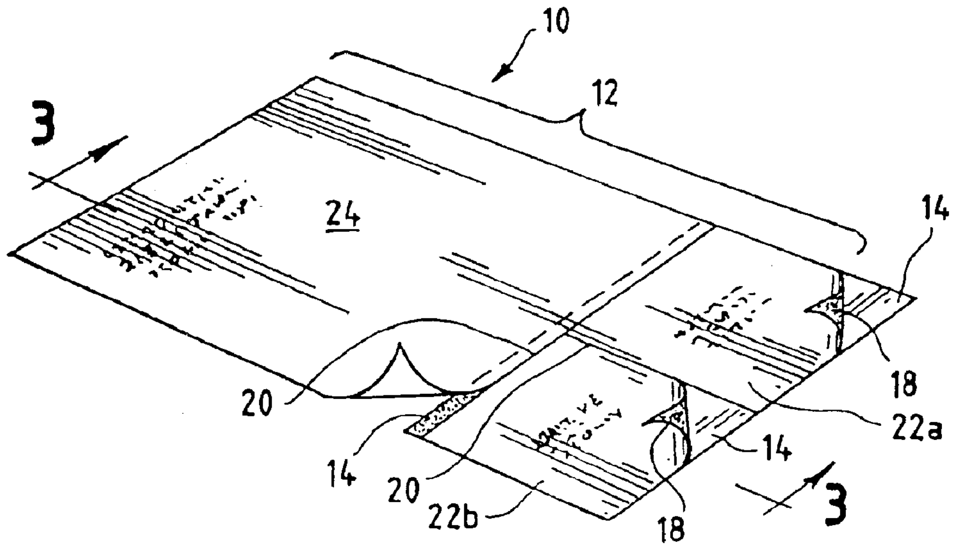
FIG. 1 is a top perspective view of an integrated label form embodying features in accordance with the present invention.
Figure 2:
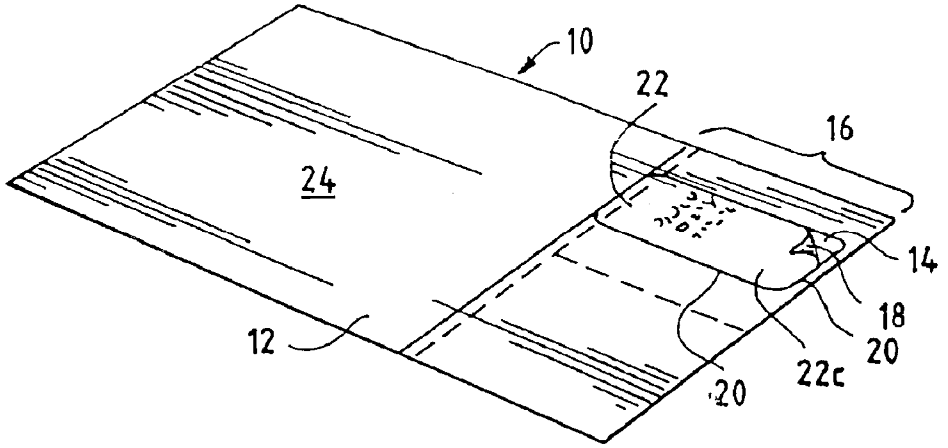
FIG. 2 is a bottom perspective view of the integrated form of FIG. 1.
Figure 3:
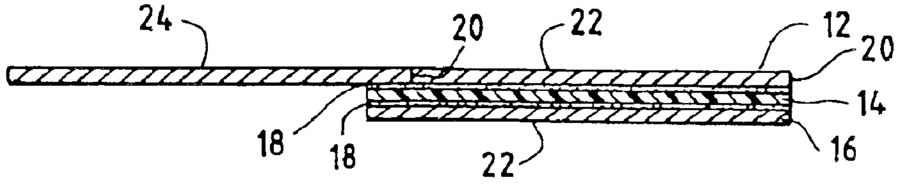
FIG. 3 is a cross-section view taken along line 3—3 of the integrated form of FIG. 1.
Figure 4:
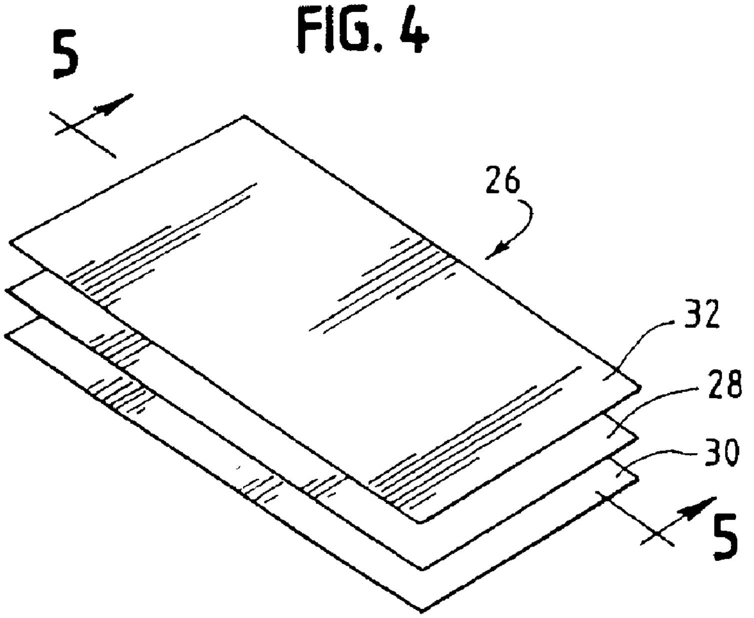
FIG. 4 is an exploded perspective view of another embodiment of an integrated label form in accordance with the present invention.

Referring to FIGS. 1–3, there is illustrated a form 10 embodying the truly integrated label features of the present invention. The integrated form 10 facilities reliable printing by the end user and convenient labels for the end user as well as others (such as consumers).

The form 10 is composed of three substrate layers: a top printable substrate 12; an intermediate liner substrate 14; and a bottom printable substrate 16. The top and bottom substrates 12 and 16 are made of material that is capable of being readily printed on using conventional printers, such as laser printers. Such materials include paper, card stock or even printable polymer based substrates.

The liner substrate 14 is mated to the top and bottom substrates 12 and 16 with a pressure sensitive adhesive 18 on both sides. The liner substrate 14 is made of material and treated such that it has reduced binding characteristics to allow a label portion 22 to be easily separated for use by the end user but that will not become detached during printing. Such liner material includes silicone coated glassine, on both sides, as well as Teflon® coated glassine, and bleach-craft may be substituted for glassine.

In manufacturing the form 10, the top and bottom printable substrates 12 and 16 are mated to the liner substrate 14 by adhesive 18. The adhesive 18 is hot melt adhesive or any other adhesive capable of releasably attaching the substrates 12 and 16 to liner substrate 14. The form 10 is then sent through a die press to create weakened lines 20 on the top substrate 12 to define top labels **22*a* and 22*b* and on the bottom substrate 16 to define bottom label 22*c*. As a result, dedicated sections of the printable substrates 12 and 16 become the labels 22*a* and 22*b*, thereby providing a form 10** with truly integrated labels.

Alternatively, the bottom side of liner 14 may already include the bottom printable substrate 16, (a pre-labeled liner). In this case, adhesive 18 is applied to the side of the liner 14 not having the label **22*c*, and mated to first printable substrate 12. The combination of substrates is then taken through a die press where the first printable substrate is pressed creating labels 22*a* and 22*b*. Alternatively, the pre-labeled liner 14 may not have been die pressed as of yet thereby requiring the second printable substrate 16** to be die pressed as well.

As illustrated in FIG. 1, the top printable substrate 12 includes two labels **22*a* and 22*b*. The remainder 24 of the top substrate 12 is left to supply printed information that does not required transfer capability via a label. Hence, the liner 14 does not extend below portion 24 of the top substrate 12. As an example, if the form 10 was an integrated label invoice form, section 24 would include the order information 22, label 22*a* would be the shipping label, label 22*b* would be the return shipping label and label 22*c* would be an additional label for other purposes. Thus, the form 10** only consumes the minimal amount of material necessary to provide the required form space and number of labels.

Where additional labels are required because more of the information on the form must be transferred, an alternate form 26 is constructed in which a larger liner substrate is incorporated into the form. Referring to FIGS. 4–7, the form 26 includes a liner substrate 28 and/or a bottom printable substrate 30 that extends over as much of the top printable substrate 32 as is necessary to provide the desired number and size of labels. As a result, the cost of supplying additional labels to transfer more information is reduced because labels are formed on both sides of the liner substrate 28 with the top substrate 32 and the bottom substrate 30.

Figure 5:
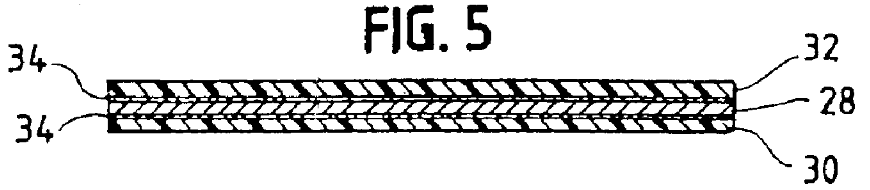
FIG. 5 is a cross-sectional view taken along line 5—5 of the integrated from of FIG. 4 as assembled.
Figure 6:
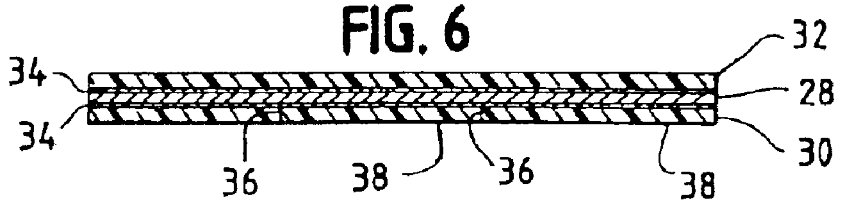
FIG. 6 is a cross-sectional view of an integrated form similar to that illustrated in FIG. 5 with the addition of multiple labels on one side.
Figure 7:
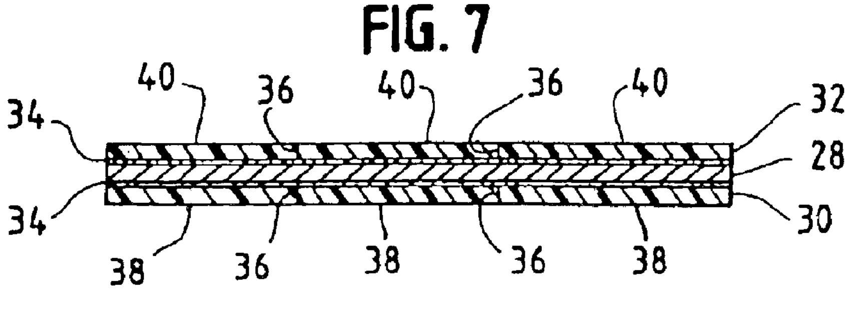
FIG. 7 is a cross-sectional view of an integrated form similar to that illustrated in FIG. 6 with the addition of multiple labels on both sides.

More specifically, as illustrated, the liner substrate 28 and the bottom substrate 30 are sized such that their edges are co-extensive with the top substrate 32. The liner substrate 26 is intermediate the top substrate 32 and the bottom substrate 30, and is affixed to such substrates with an adhesive 34. As illustrated in FIG. 5, the bottom and top substrates 30 and 32 each constitute one large label. As illustrated in FIG. 6, the top substrate 32 constitutes one large label, and the bottom substrate 30 is die cut to include cut lines 36 that define a number of labels 38. As illustrated in FIG. 7, the top substrate 32 also is die cut to include cut lines 36 which define a number of labels 40. The material for the top and bottom substrates (32 and 30), the liner 26 and the adhesive 34 is the same as that described above for form 10 of FIGS. 1–3.

Figure 8:
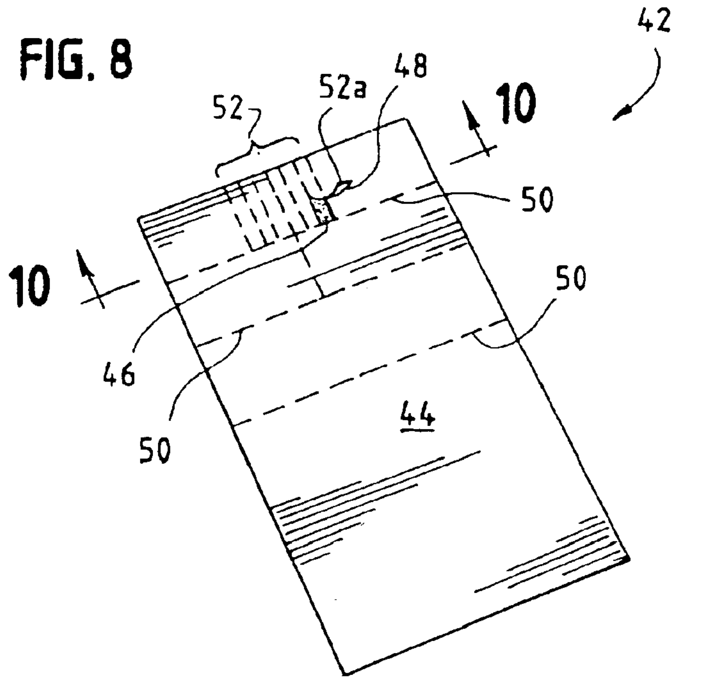
FIG. 8 is a top perspective view of another embodiment of an integrated label form in accordance with the present invention.
Figure 9:
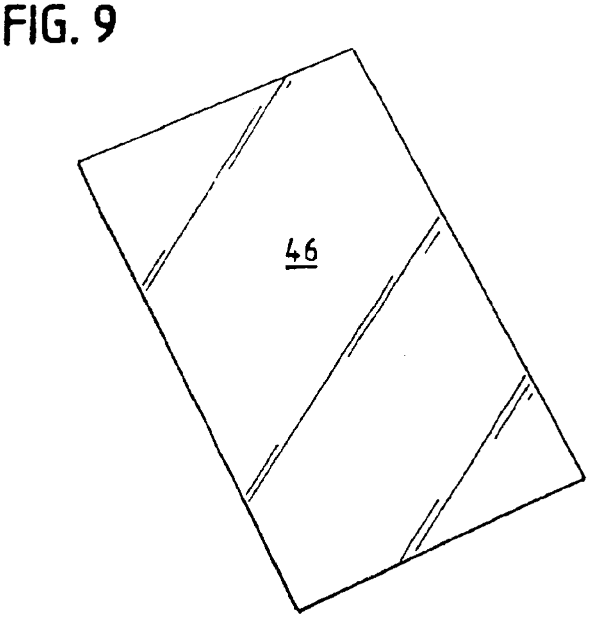
FIG. 9 is a bottom perspective view of the integrated from of FIG. 8.
Figure 10:
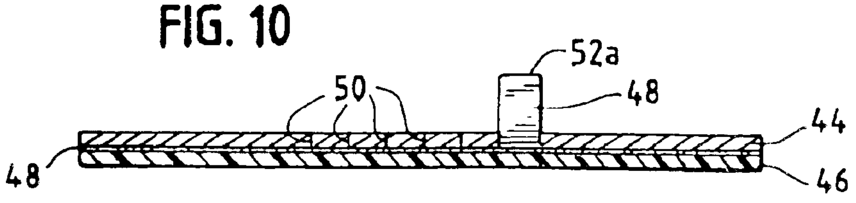
FIG. 10 is a cross-sectional view taken along line 10—10 of the integrated form of FIG. 8.
Figure 11:
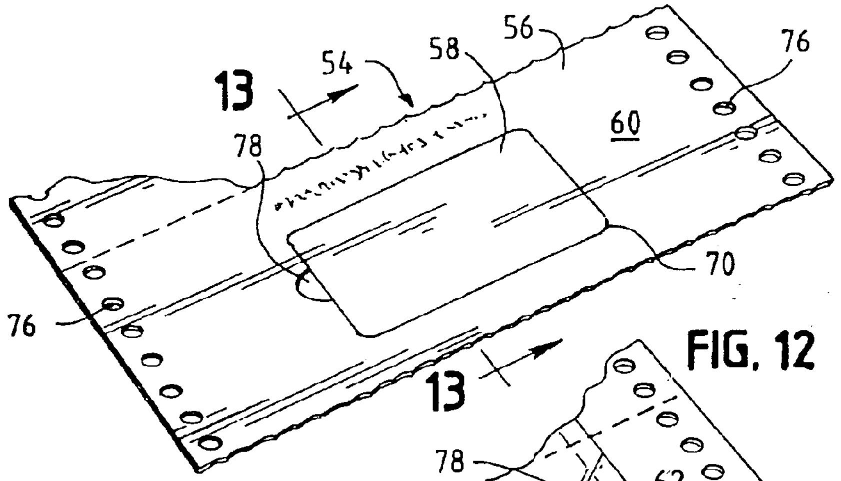
FIG. 11 is a top perspective view of an integrated card form embodying features in accordance with the present invention.
Figure 12:
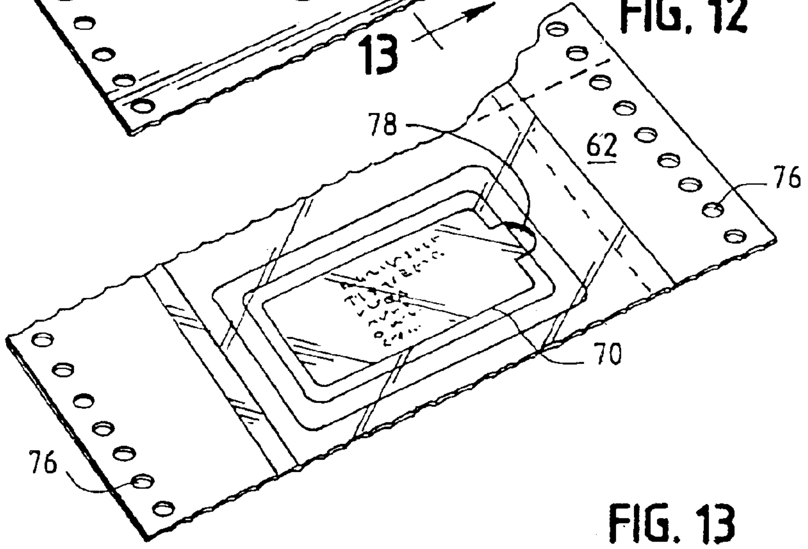
FIG. 12 is a top perspective view of the integrated card form of FIG. 11 with card removed.
Figure 13:
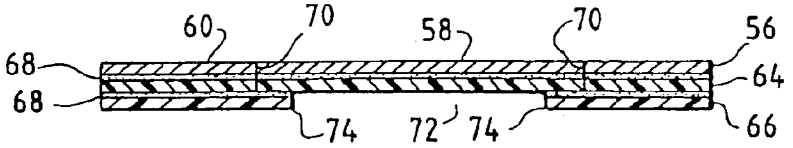
FIG. 13 is a cross-sectional view taken along line 13—13 of the integrated card form of FIG. 11.
Figure 14:
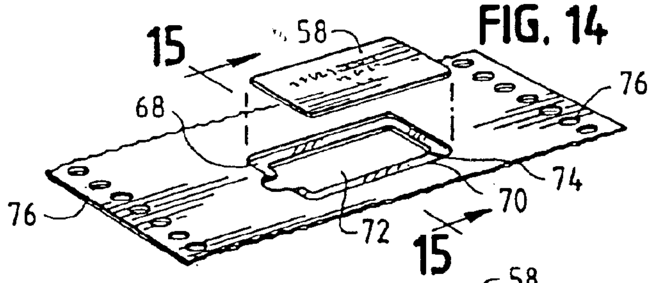
FIG. 14 is an exploded perspective view of the integrated card form of FIG. 11.
Figure 15:
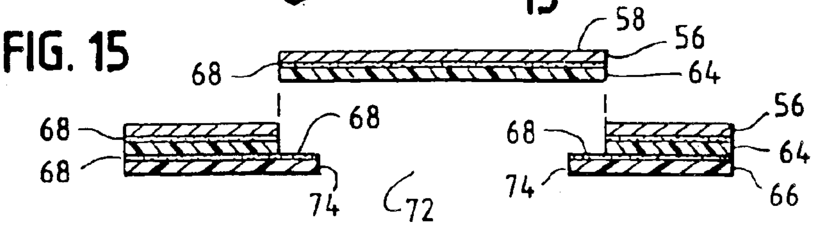
FIG. 15 is a exploded cross-sectional view taken along line 15—15 of the integrated card form of FIG. 14 with a corresponding cross-section of the card suspended above.

Referring to FIGS. 8–10, an integrated label form 42 in accordance with another aspect of the invention is shown. The form 42 includes a printable substrate 44 and a liner substrate 46. With form 42, the liner substrate 46 does not include any indentations or deformations as a result of die cutting to form the labels because the printable substrate 44 is die pressed before being mated to the liner substrate 46. By die pressing printable substrate 44 prior to mating it with liner substrate 46, the liner substrate 46 is not exposed to any possibility of being weakened or deformed due to the die cutting process. This ensures that the liner substrate 46 will be as smooth and uniform as possible, and increases the likelihood that the integrated form 42 will print properly.

More specifically, the printable substrate 44 is affixed to the liner substrate 46 by adhesive 48. Prior to affixing these substrates, the printable substrate 44 is die pressed to form lines of weakness 50 (or perforations) that define a number of labels 52. As illustrated with label **52*a*, one can easily peal the labels from the liner substrate 46 along the lines of weakness 50. The adhesive 48 lifts off the liner substrate 46 and remains with the label 52*a*** so that it can be transferred and affixed to another surface.

To manufacture this form 42, the printable substrate 44 is printed with the desired graphics and/or text and is then die pressed to designated the labels 52 with the appropriate lines of weakness 50. Finally, the printed substrate 44 is mated to the liner with the adhesive 48.

Referring to FIGS. 11–15, there is illustrated an integrated card form 54 embodying features of the present invention. The form 54 includes a printable substrate 56 from which is formed a card 58. The printable substrate 56 has a top side 60 and a bottom side 62 upon which both sides can be printed any desired graphics and/or text.

The bottom side 62 is covered with a first layer of laminate 64 over the card portion 58. The first layer of laminate 64 provides rigidity and protection to the card 58. A second layer of laminate 66 is affixed to the first layer 64 to hold the card 58 in place in the form. Both layers of laminate include a layer of adhesive 68 on one side for affixation to the substrate 56 and the other layer of laminate 64.

The card 58 is defined by a number of lines of weakness or cuts 70 die cut through the substrate 56 and the first layer of laminate 64. The second layer of laminate 66 includes an aperture 72 at the card 58 which is defined by a ledge 74 that extends inward beyond the cuts 70 to expose the adhesive 68 to secure the card 58 in place. The ledge may have a width of ⅛th of an inch width.

In other words, the card 58 rests against the ledge 74 and the adhesive 68 at the ledge 74 affixes to the first layer of laminate 74 about the perimeter portion of the card 58 in a manner that prevents unintentional release of the card 58 while also allowing the card 58 to be intentionally removed. For instance, to remove the card 58, one can easily press from the backside of the card 58 to push the card from the form 54. The size of the ledge 74 and the amount and type of adhesive 68 is coordinated to provide the appropriate gripping action on the card 58.

Alternatively, the second layer of laminate may not have an aperture, but may act as a transparent window exposing the bottom of the card. In this instance, it is preferred that the entire window area not be covered completely with adhesive to facilitate removal of the card.

To manufacture the integrated card form 54, the top side 60 and bottom side 62 of card 58 are printed with graphics and text as desired. Next, the first layer of laminate 64 is mated with the back side of substrate 56 and then the second layer of laminate 66. The lines of weakened substrate or cuts 70 are die cut from the top side 60 of the substrate 56 through the first layer of laminate 64 to form the card 58. The second layer of laminate 66 is not cut so that it can hold the card 58 in the form 54 against unintentional detachment. Alternatively, the second layer of laminate 66 may be cut to remove a portion at the card and to form the ledge 74. This is performed prior to mating the second layer of laminate 66 with the first layer of laminate 64. The entire process is to be done on a single machine. Feed structure 76 is provided to aid with feeding the integrated form through a printer (not shown). However in alternate embodiments no feed structure 76 may be provided.

To further assist in card removal, the form 54 also includes a recess 78 adjacent the card 58 for one to insert a finger, thumb, or part thereof to facilitate removal. The recess extends through the printable substrate 56 and both the layers of laminate 64 and 66. Recess 78 could be used in a similar manner in integrated form 10 (FIGS. 1–3), form 26 (FIGS. 4–7), and form 42 (FIGS. 8–10). That is, a portion of the substrate could be die cut prior to being mated with the liner and the liner could be blocked from receiving adhesive at that section. As a result, a portion of the liner is exposed and one can easily peel the label from the liner to separate it from the form.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A business form having an removable integrated card, the business form comprising:

a base layer having a printable first side and an opposing printable second side;

a liner layer having a first side and an opposing second side, the first side of the liner layer being adhesively secured to at least a portion of the second side of the base layer;

a backing layer having a first side and an opposing second side, the first side being adhesively secured to at least a portion of the second side of the liner layer, the first side of the backing layer having a greater affinity for retaining adhesive than the second side of the liner layer;

an integrated removable card comprising at least a portion of the base layer, the liner layer and the backing layer, the card having a periphery edge substantially defined by a first die cut extending substantially through the base and liner layers, and having a second die cut within the periphery edge of the card and extending through at least a portion of the backing layer so that the backing layer maintains the card in the form against unintentional removal from the form;

a cut-out extending through the base, liner and backing layers and positioned adjacent the periphery of the card to assist in removal of the card from the form; and the base layer comprises cardstock material, and the liner and backing layers comprise transparent films.

2. A business form in accordance with claim 1, wherein indicia is printed on the first and second sides of the base layer.

3. A business form in accordance with claim 2, wherein indicia is printed on the first and second sides of the card.

4. A business form in accordance with claim 3, wherein unprinted space capable of receiving printed indicia is provided on the first side of the card.

5. A business form in accordance with claim 1, wherein the base layer is rectangular, having a predetermined length and width, and the liner layer extends generally along the entirety of at least one of the predetermined length and width of the base layer.

6. A business form in accordance with claim 5, wherein the backing layer extends generally along the entirety of the at least one of the predetermined length and width of the base layer.

7. A business form in accordance with claim 6, wherein the backing layer extends beyond at least one edge of the liner layer and the first side of the backing layer is adhered to the second side of the base layer.

8. A business form in accordance with claim 1, wherein the cut-out is arcuate in shape and the periphery of the card is generally rectangular.

9. A method of producing a business form having a removable integrated card, the method comprising:

providing a base layer having a first side and an opposing second side;

adhesively securing a first side of a liner layer to at least a portion of the second side of the base layer;

adhesively securing a first side of a backing layer to at least a portion of a second side of the liner layer, the first side of the backing layer having a greater affinity for retaining adhesive than the second side of the liner layer;

cutting an integrated removable card from at least a portion of the base and liner layers;

cutting an integrated removable card portion of the backing layer adhesively attached to the integrated removable card within the periphery of the card, thereafter supporting the card with portions of the backing layer other than the integrated removable card portion of the backing layer;

positioning a cut-out extending through the base, liner and backing layers adjacent the periphery of the card, the cut-out facilitating removal of the integrated removable card from the form; and the base layer comprises cardstock material, and the liner and backing layers comprise transparent films.

10. A method of producing a business form in accordance with claim 9, including printing indicia on the first and second sides of the base layer.

11. A method of producing a business form in accordance with claim 10, including printing indicia on the first and second sides the card.

12. A method of producing a business form in accordance with claim 11, including providing unprinted space on the first side of the card adapted to receiving printed indicia.

13. A method of producing a business form in accordance with claim 9, wherein the base layer has a predetermined length and width, and including extending the liner layer generally along the entirety of at least one of the predetermined length and width of the base layer.

14. A method of producing a business form in accordance with claim 13, including extending the backing layer generally along the entirety of the at least one of the predetermined length and width of the base layer.

15. A method of producing a business form in accordance with claim 14, including extending the backing layer beyond at least one edge of the liner layer and adhering the first side of the backing layer to the second side of the base layer.

16. A method of producing a business form in accordance with claim 9, wherein the cut-out is arcuate in shape and the periphery of the card is generally rectangular.

17. A business form having an removable integrated card, the business form comprising:

a rectangular base layer having a predetermined length and width and having a printable first side and an opposing printable second side;

a liner layer having a first side and an opposing second side, the first side of the liner layer being adhesively secured to at least a portion of the second side of the base layer, and the liner layer extends generally along the entirety of at least one of the predetermined length and width of the base layer;

a backing layer having a first side and an opposing second side, the first side being adhesively secured to at least a portion of the second side of the liner layer, the first side of the backing layer having a greater affinity for retaining adhesive than the second side of the liner layer, the backing layer extends generally along the entirety of the at least one of the predetermined length and width of the base layer, and the backing layer extends beyond at least one edge of the liner layer and the first side of the backing layer is adhered to the second side of the base layer;

an integrated removable card comprising at least a portion of the base layer, the liner layer and the backing layer, the card having a periphery edge substantially defined by a first die cut extending substantially through the base and liner layers, and having a second die cut within the periphery edge of the card and extending through at least a portion of the backing layer so that the backing layer maintains the card in the form against unintentional removal from the form; and a cut-out extending through the base, liner and backing layers and positioned adjacent the periphery of the card to assist in removal of the card from the form.

18. A method of producing a business form having a removable integrated card, the method comprising:

providing a base layer having a predetermined length and width and having a first side and an opposing second side;

adhesively securing a first side of a liner layer to at least a portion of the second side of the base layer and extending the liner layer generally along the entirety of at least one of the predetermined length and width of the base layer;

adhesively securing a first side of a backing layer to at least a portion of a second side of the liner layer, the first side of the backing layer having a greater affinity for retaining adhesive than the second side of the liner layer, and extending the backing layer generally along the entirety of the at least one of the predetermined length and width of the base layer, extending the backing layer beyond at least one edge of the liner layer and adhering the first side of the backing layer to the second side of the base layer;

cutting an integrated removable card from at least a portion of the base and liner layers;

cutting an integrated removable card portion of the backing layer adhesively attached to the integrated removable card within the periphery of the card, thereafter supporting the card with portions of the backing layer other than the integrated removable card portion of the backing layer; and positioning a cut-out extending through the base, liner and backing layers adjacent the periphery of the card, the cut-out facilitating removal of the integrated removable card from the form.

* * * * *